United States Patent
Voss et al.

(10) Patent No.: US 9,487,645 B2
(45) Date of Patent: Nov. 8, 2016

(54) FLAME RETARDANT COMPOSITION FOR THERMOPLASTIC POLYMERS CONSISTING OF POROUS, AMORPHOUS GLASS POWDER AND MELAMINE CYANURATE

(71) Applicant: TROVOTECH GMBH, Bitterfeld-Wolfen (DE)

(72) Inventors: Hans-Juergen Voss, Voerstetten (DE); Uwe Ferner, Bitterfeld-Wolfen Ot Bobbau (DE)

(73) Assignee: Trovotech GmbH, Bitterfeld-Wolfen (DE)

(*) Notice: Subject to any disclaimer, the term of this patent is extended or adjusted under 35 U.S.C. 154(b) by 72 days.

(21) Appl. No.: 14/383,620

(22) PCT Filed: Dec. 21, 2012

(86) PCT No.: PCT/EP2012/005330
§ 371 (c)(1),
(2) Date: Sep. 8, 2014

(87) PCT Pub. No.: WO2013/131545
PCT Pub. Date: Sep. 12, 2013

(65) Prior Publication Data
US 2015/0018453 A1  Jan. 15, 2015

(30) Foreign Application Priority Data
Mar. 7, 2012  (DE) .................. 10 2012 004 357

(51) Int. Cl.
*C08K 7/28* (2006.01)
*C09K 21/10* (2006.01)
*C08K 5/3492* (2006.01)
*C08L 77/02* (2006.01)
*C08J 3/22* (2006.01)
*C08L 21/00* (2006.01)

(52) U.S. Cl.
CPC .. *C08K 7/28* (2013.01); *C08J 3/22* (2013.01); *C08J 3/226* (2013.01); *C08K 5/34924* (2013.01); *C08L 21/00* (2013.01); *C08L 77/02* (2013.01); *C09K 21/10* (2013.01); *C08J 2377/02* (2013.01); *C08J 2477/02* (2013.01); *C08L 2201/02* (2013.01)

(58) Field of Classification Search
CPC ................. C08K 7/28; C08L 77/02
See application file for complete search history.

(56) References Cited

U.S. PATENT DOCUMENTS

| 5,482,985 A | 1/1996 | Baierweck et al. |
| 6,184,282 B1 * | 2/2001 | Gareiss .............. C08K 5/34928 524/101 |
| 6,815,477 B1 | 11/2004 | Arai et al. |
| 7,153,897 B2 | 12/2006 | Tanaka et al. |
| 2007/0161725 A1 | 7/2007 | Janssen |
| 2011/0319534 A1 | 12/2011 | Ding et al. |
| 2011/0319536 A1 | 12/2011 | Ding et al. |

FOREIGN PATENT DOCUMENTS

| CN | 1201474 A | 12/1998 | |
| CN | 1521573 A | 8/2004 | |
| CN | 1914273 A | 2/2007 | |
| CN | 101460391 A | 6/2009 | |
| DE | 4307682 A1 | 9/1994 | |
| DE | 19532720 A1 | 3/1997 | |
| DE | 10252693 A1 * | 6/2004 | ............. C03B 19/08 |
| DE | 60029009 T2 | 1/2007 | |
| DE | 10252693 B4 | 3/2007 | |
| DE | 10144231 B4 | 6/2008 | |
| DE | 102007037019 A1 | 2/2009 | |
| JP | 2002201040 A * | 7/2002 | |

OTHER PUBLICATIONS

English Machine Translation of DE10252693 A1 Obtained Feb. 18, 2016 at http://worldwide.espacenet.com/publicationDetails/biblio?CC=DE&NR=10252693A1&KC=A1&FT=D&ND=3&date=20040603&DB=EPODOC&locale=en_EP.*
English Machine Translation of JP2002-201040 A—obtained Feb. 24, 2016 at https://www4.jplatpat.inpit.go.jp/eng/tokujitsu/tkbs_en/TKBS_EN_GM401_Detailed.action.*

* cited by examiner

*Primary Examiner* — Ling Choi
*Assistant Examiner* — Lanee Reuther
(74) *Attorney, Agent, or Firm* — Laurence A. Greenberg; Werner H. Stemer; Ralph E. Locher

(57) ABSTRACT

A flame retardant composition for thermoplastic molding materials, and also moldings, fibers or films that can be prepared from the flame retardant molding materials. The composition includes 30 to 70% by weight of melamine cyanurate and of 30 to 70% by weight of porous amorphous glass particles. The composition is prepared from foam glass produced continuously in a high-temperature extruder. The sum of the components is 100% by weight.

13 Claims, No Drawings

FLAME RETARDANT COMPOSITION FOR THERMOPLASTIC POLYMERS CONSISTING OF POROUS, AMORPHOUS GLASS POWDER AND MELAMINE CYANURATE

BACKGROUND OF THE INVENTION

Field of the Invention

The invention relates to a flame retardant composition for thermoplastic moulding materials.

Further, the invention relates to mouldings, fibres or films that can be prepared from the flame retardant moulding materials according to the invention.

Currently, the following groups of materials are mainly used as flame retardants for thermoplastic moulding materials:

1. Inorganic compounds, mainly hydroxides such as aluminium hydroxide and magnesium hydroxide. When these are used, very large quantities of generally more than 50% must be used and these influence the mechanical properties of the moulding material extremely negatively. Additionally, the aluminium trihydroxide begins to decompose at just 200° C. This sharply limits the possible applications as some thermoplastics are processed at temperatures of above 200° C.
2. Halogenated (brominated and chlorinated) flame retardant materials, which can produce dioxins in case that they catch fire and therefore many of these compounds are prohibited according to the EU Regulation for Chemicals.
3. Halogenated phosphorous compounds, which can also produce dioxins in case that they catch fire.
4. Non-halogenated phosphorous compounds including red phosphorous. Some of the phosphorous compounds such as ammonium polyphosphate and melamine phosphate are also not thermally stable at temperatures of >200° C.
    Other phosphorous compounds such as triphenylphosphene oxide act as plasticisers in many thermoplastic materials. Red phosphorus is particularly effective in the case of thermoplastics with a high moisture content, e.g. PA 6. High processing temperatures for the thermoplastics can however lead to the formation of phosphine which is a poisonous gas.
5. Nitrogen-based flame retardant materials such as melamine, melamine derivatives (including melamine cyanurate) and melamine homologues.

In these cases, the disadvantage is that the melamine, which has been added to the plastic materials, diffuses out of the polymer matrix. Melamine cyanurates, the salt of the reaction between melamine and cyanuric acid, however hardly diffuses out of the plastics. The reason for this is the two-dimensional network structure of melamine cyanurate that is based on hydrogen bonds.

However, this also results in a great disadvantage of melamine cyanurate.

It tends to form large agglomerates and to compaction at the dosing stage itself, when incorporated in polymers. Its dispersion in technical plastics is difficult. The agglomeration of melamine cyanurate in polymers has a negative effect on the mechanical properties and on fire behaviour. Many trials were conducted in the past to improve its dispersion.

Besides that, good flame retardant effects were mainly observed only in the case of non-reinforced thermoplastics when melamine cyanurate was used.

In particular, in the case of fibre reinforced polyamides, the so-called wicking effect occurs, this means that the fibre reinforced polyamide test rod continues to burn due to the fibres contained in it.

In DE 102007037019A1, as well as in other documents by the same author, the use of phosphinic acid or salts of phosphinic acid is claimed as flame retardant materials in polyamides.

In DE 4307682A1, a flame protected thermoplastic moulding material is claimed which consists of polyamide, magnesium hydroxide along with other fillers and additives. The flame protection is supposed to be achieved by the combination of the known flame retardant material, melamine cyanurate and magnesium hydroxide. 15% by weight of melamine cyanurate or 10% by weight of melamine cyanurate combined with 15% by weight of magnesium hydroxide was used to achieve the flame retardant properties.

In DE 10144231B4, a process for a coating of melamine cyanurate is described, wherein the melamine cyanurate is mixed in solution with monomers, oligomers and/or lactam-based polymers. The disadvantage of this is that the mixing must take place in an aqueous state and subsequent filtration and drying is required.

In DE 60029009T2, a flame inhibiting polyamide-resin composite consisting of polyamide resin, a mix of polyphosphoric acid and melamine along with organic fillers is claimed. In this case it relates to a combination of two known materials for the flame protection of polyamides.

A flame protection agent for thermoplastic moulding material is presented that consists of 30 to 70% by weight of melamine cyanurate and 30 to 70% by weight of porous, amorphous glass particles manufactured from glass foam continuously produced in a high-temperature extruder. The sum of the components totals up to 100% by weight.

BRIEF SUMMARY OF THE INVENTION

The objective of the present invention also includes the thermoplastic moulding material mixed with melamine cyanurate and amorphous, porous glass particles according to the invention.

The moulding materials contain 30 to 95% by weight of one or several thermoplastic polymers, 1 to 20% by weight of the mix of melamine cyanurate and the amorphous, porous glass particles, preferably 2 to 15% by weight of this mix, particularly preferable is 5 to 12% by weight of this mix, 0 to 70% by weight of fillers and reinforcing agents along with 0 to 50% by weight of other aids. The sum of the components totals to 100% by weight.

Further objectives of the invention are moulds, fibres and films that can be prepared from the thermoplastic moulding material according to the invention.

The flame protection agent claimed in the thermoplastic moulding material can also be incorporated as a masterbatch, i.e. a compound with a high concentration of the flame protection agent in the thermoplastic moulding material. This masterbatch can contain other aids such as plasticisers, nucleation agents, demoulding and lubricating agents, flow agents and processing aids, antioxidants, heat and light stabilisers, colouring agents, pigments and other flame protection agents.

In the same way, the aids listed above can also be directly incorporated in the thermoplastic moulding material.

The following can also be added to the thermoplastic moulding material: fillers and reinforcing materials such as feldspar, glimmer, talc, quartz, silicate, amorphous silica, magnesium carbonate, barium sulphate, carbon fibres, aramid fibres, potassium-titanium fibres, natural fibres, glass fibres (short fibres, long fibres or endless fibres), glass beads, glass mesh, glass mats, kaolin, titanium dioxide, calcium silicate as wollastonite etc. The fillers and reinforcing agents can also have undergone surface treatment.

Thermoplastic moulding materials, according to the invention, to which the flame protection composition can be added are homo-polymers and co-polymers of olefinic, unsaturated monomers such as polyfluoroethylene, polyethylene, polypropylene, ethylene-propylene co-polymers, polystyrene, styrene-acrylonitrile co-polymers, ABS co-polymers, vinyl chloride homo-polymers and co-polymers, polyacrylate, vinyl acetate co-polymers such as ethylene vinyl acetate, polyacetate, polycarbonate, polyester and in particular, polyamides. They can also be compounds made up of two or more of the thermoplastic moulding materials.

Rubber-elastic polymerisates can also be components of the thermoplastic moulding materials, according to the invention. The preferred ones here are the so-called ethylene-propylene-diene rubbers (EPM and EPDM rubbers). The EPM and EDPM rubbers can preferably also be grafted to reactive carboxylic acid or its derivatives.

The polyamide resins can be formed by the polycondensation of lactams with 3 or more membered rings or of polymerisable amino acids or by polycondensation between dibasic acids and diamines. Examples of polyamides are polymers of ϵ-caprolactam, amino-capronic acid, β-lactam, γ-lactam, δ-lactam, ϵ-lactam, 7-amino-heptanic acid, 11-amino-decanic acid, pyridine, piperidone and the like, formed by the polycondensation between diamines such as hexa-methylene, nona-methylene, undeca-methylene, dodeca-methylene, m-xylene diamine and dicarbonic acids such as terephalic, isophthalic, adipinic, sebacinic, dodeca-dicarbonic and glutaric acid or copolymers of those. Specific examples of the polyamides are polyamide 4, polyamide 6, polyamide 7, polyamide 8, polyamide 11, polyamide 12, Polyamide 6.6, polyamide 6.9, polyamide 6.10, polyamide 6.11, polyamide 6.12, polyamide 6T, polyamide 6/6.6, polyamide 6/12, polyamide 6/6T and polyamide 6I/6T, without limiting them to these only.

In particular, polyamide 6 and polyamide 6.6 and mixtures of those are preferred.

The porous, amorphous glass particles are manufactured from glass foam. To do so, the molten glass is mixed in a high-temperature extruder (single screw extruder) at around 1000° C. with steam under pressure as a foaming agent.

At the subsequent decompression of the mixture at the extruder outlet jet, a glass foam with fine pores is formed which has a density of 0.05 to 0.30 g/cm$^3$, preferably 0.8 to 0.15 g/cm$^3$. The glass foam strand is not stress-relieved and cools down, within seconds, to temperatures of below 50° C.

It is made up of closed pores that however, generally break open due to the quick cooling down.

In the same way, the glass foam strand also crumbles into irregular pieces.

Further downstream, the irregular pieces are pre-crushed in a roll crusher with a 7 mm perforated strainer. Then, the milling (ball mill) is carried out and classification (turbine classifier) of the pre-crushed glass foam pieces to the corresponding particle sizes is done, wherein an average particle size ($d_{50}$) of between 1 and 100 μm, in particular that of between 2 and 6 μm is preferred.

For the use in flame protection mixtures, borosilicate glass is preferred. Borosilicate glass has good hydrolytic resistance, a lower coefficient of thermal expansion than soda lime glass and is inert to thermoplastic moulding materials.

Through the quick cooling down of the glass foam and the milling process, porous, amorphous glass particles with a special surface are formed.

Borosilicate glass particles with the composition given above and an average particle size of 3.0 μm sinter at a heat treatment temperature in the range of just 360 to 400° C. This behaviour is used as the basic approach for the development of flame protection agents that contain these porous, amorphous glass particles.

Melamine cyanurate is a reaction product of preferably equimolar quantities of melamine and cyanuric acid or iso-cyanuric acid.

It is formed, for example, by the conversion of the aqueous solutions of the input products at 90 to 100° C. The final commercial product is a white powder with an average particle size ($d_{50}$) of between 1.0 and 100.0 μm.

In the framework of this patent application, all the customary, in trade and commercially available, solid and preferably in particle form, product qualities of melamine cyanurate are to be considered. The preferred average particle size of the melamine particles is between 1.0 and 10.0 μm.

The melamine cyanurate can however also be manufactured from melamine and cyanuric acid or iso-cyanuric acid in the presence of the amorphous, porous glass particles.

To do so, melamine and cyanuric acid or iso-cyanuric acid in a mole ratio of 1.0 to 0.5 going up to 1.0 to 1.5 and 0.5 to 1.0 going up to 1.5 to 1.0 can be used. However, equimolar mixing ratios are preferred. Melamine and cyanuric acid or iso-cyanuric acid are first separately dissolved in an aqueous medium at a temperature of 70 to 100° C., preferably 90 to 100° C. and then mixed. Then, the mixture of melamine cyanurate and the porous, amorphous glass particles can be separated by the usual separation methods of filtration or centrifuging. The water still present can be removed by the usual drying methods, preferably at temperatures of up to a max. of 100° C.

The present invention also relates to the use of such moulding materials for the preparation of moulds, fibres and films as well as of moulds of all types that can be obtained through this process.

DESCRIPTION OF THE INVENTION

The present invention is to be explained in further detail based on the following example that has been proven in some series of experiments.

Glass foam was manufactured from a borosilicate glass with the chemical composition specified in Table 1 with steam as a foaming agent, in a single-screw extruder at a melt temperature of 930° C.

The transformation point of the glass composition given above is 534° C.

Subsequently, pre-crushing of the glass foam was carried out in a roller crusher to a glass foam particle size of ≤7 mm. In a subsequent combined grounding and classification process (ball mill and turbine classifier), crushing to an average particle size of 2.8 μm was undertaken (particle size distribution: $d_{10}$=0.7 μm; $d_{25}$=1.2 μm; $d_{50}$=1.8 μm $d_{75}$=2.8 μm; $d_{90}$=4.1 μm and $d_{99}$=8.6 μm).

A masterbatch was made of the raw materials, melamine cyanurate (type NORD-MIN MC-25J; supplier Nordmann, Rassmann GmbH), the porous, amorphous glass particles and polyamide 6 (Manufacturer: Radici, relative viscosity 2.69, measured in 96% $H_2SO_4$ as a 0.5% solution at 25° C. according to DIN ISO 307; monomer content 0.08%; moisture 190 ppm; extract as a whole: 0.82%), the masterbatch containing 40% by weight of melamine cyanurate, 40% by weight of porous, amorphous glass particles and 20% by weight of PA 6.

Three mixtures with different compositions were made from the raw materials polyamide 6 and the masterbatch for a test series:

Mixture A—Consisting of 8% by weight of masterbatch and 92% by weight of PA 6.

Mixture B—Consisting of 10% by weight of masterbatch and 90% by weight of PA 6.

Mixture C—Consisting of 20% by weight of masterbatch and 80% by weight of PA 6.

Subsequently, these mixtures were dried for 5 hours at 80° C. and a residual moisture of <0.09% was achieved.

The components were processed in a twin-screw extruder, ZSK 32 (manufacturer: Werner and Pfleiderer) at a cylinder temperature of 260 to 280° C.

Standard test samples for the flame protection test according to UL 94V with dimensions of 125 mm×13 mm×0.8 mm were made.

For the comparison, a commercially available polyamide flame protection kit, with the name of PA-Funaden-Flammhemmer (flame retarder), manufactured by the company Grafe Masterbatch GmbH, also with the PA 6 from Example 2 was mixed and also dried. From this mixture, standard test samples were also prepared for the flame protection test according to UL 94V.

All the above standard test samples were stored for 48 hours at a reference atmosphere of 23/50 Class 1 according to DIN EN ISO 291 prior to the beginning of the flame protection test.

The fire behaviour was tested according to UL 94V ("Tests for Flammability of Plastic Materials for Parts in Devices and Applications" of Unterwriter Laboratories Inc., now also accepted as DIN EN 60695-11-10). In this test process, the vertically arranged test samples were set alight using a Bunsen burner with a flame height of 20±1 mm for 10 seconds each. The period for the burn and the total burning time as well as the parts that dripped off while still burning, are the evaluation parameters.

For the classification of a flame protected plastic of the fire class UL 94V-0, the following criteria must be fulfilled:

In the case of a set of 5 standard test samples (dimensions: 125×13×s, where s=0.8 to 13 mm), all the samples may not continue to burn for longer than 10 seconds after being set alight twice for a duration of 10 seconds using an naked flame with a height of 20 mm.

The sum of the continued burning times for 5 test samples, in the case of being set alight 10 times, may not exceed 50 s.

The test samples must not have any burning material dripping down, completely burn off or continue to glow for more than 30 seconds.

The cotton placed under the test samples may not begin to burn.

For the classification under UL 94V-1, the individual continued burning time may not exceed 60 sec. and the sum of the continued burning times for the 10 flamings of the 5 test samples may not exceed 250 sec. Besides that, all the test samples may not continue to burn for more than 30 sec. after being set alight. The other criteria are identical to the classification for UL 94V-0.

The classification in the fire class UL 94V-2, allows the cotton to burn in addition to the specification given for fire class UL 94V-1.

In the comparative test with 10% by weight of PA-Funaden-Flammhemmer, the fire class UL 94V-2 could be achieved. The fire class UL 94V-2 could also be achieved in the flame tests with the use of 8% by weight of the flame protection masterbatch made of melamine cyanurate, porous, amorphous borosilicate glass particles and the polyamide 6. In the case of both these samples, the sum of the continued burning times was lower than 50 s for 10 flamings, however the cotton placed under the samples being set on fire, caught fire in some cases only. If against that, 10% by weight of the flame protection masterbatch was used, the fire class UL 94V-0 could be easily achieved. In the case of this sample too, the sum of the continued burn times of 8.7 seconds was clearly less than the specified maximum value of 50 s for the classification under VO. The cotton placed under the samples did not however catch fire in this case. In this trial, only 4% by weight of melamine cyanurate and 4% by weight of the porous glass powder were used.

Further results of the flame trials according to UL 94V for the various mixtures are listed in Tables 2 to 5.

TABLE 1

Chemical composition of the borosilicate glass

| Oxide | Borosilicate glass |
| --- | --- |
| $SiO_2$ [mass %] | 55.0-60.0 |
| $Na_2O$ [mass %] | 9.5-13.5 |
| $K_2O$ [mass %] | 1.0-4.0 |
| CaO [mass %] | 1.0-5.0 |
| MgO [mass %] | 0-2.0 |
| BaO [mass %] | 3.0-6.0 |
| ZnO [mass %] | 3.0-5.0 |
| $B_2O_3$ [mass %] | 8.0-11.0 |
| $Al_2O_3$ [mass %] | 4.0-7.0 |
| $Fe_2O_3$ [mass %] | <0.2 |
| $F_2$ mass %] | <1.0 |

TABLE 2

Comparative mixture with 10% by weight of PA-Funaden-(flame retardant)

| Rod No. | Thickness [mm] | $t_1$ [s] | Cotton burns | $t_2$ [s] | Cotton burns | Classification |
| --- | --- | --- | --- | --- | --- | --- |
| 1 | 0.80 | 1.9 | no | 1.7 | no | 94 V-2 |
| 2 | 0.80 | 1.2 | yes | 0.8 | | |
| 3 | 0.80 | 1.0 | no | 0.9 | no | |
| 4 | 0.80 | 0.8 | no | 0.8 | yes | |
| 5 | 0.80 | 1.3 | no | 1.5 | no | |
| 6 | 0.80 | 0.9 | no | 1.4 | no | 94 V-2 |
| 7 | 0.80 | 1.2 | no | 0.7 | no | |
| 8 | 0.80 | 0.9 | no | 0.8 | no | |
| 9 | 0.80 | 0.9 | no | 1.4 | yes | |
| 10 | 0.80 | 1.3 | no | 1.4 | no | |

Burning pieces of the samples drip down.

TABLE 3

Mixture A consisting of 92% by weight of PA 6 and 8% by weight of melamine cyanurate-glass powder-Flammhemmer (flame retardant)-masterbatch

| Rod No. | Thickness [mm] | $t_1$ [s] | Cotton burns | $t_2$ [s] | Cotton burns | Classification |
| --- | --- | --- | --- | --- | --- | --- |
| 1 | 0.80 | 1.0 | yes | 0.7 | no | 94 V-2 |
| 2 | 0.80 | 1.0 | yes | 0.9 | yes | |

TABLE 3-continued

Mixture A consisting of 92% by weight of PA 6 and 8% by weight of melamine cyanurate-glass powder-Flammhemmer (flame retardant)-masterbatch

| Rod No. | Thickness [mm] | $t_1$ [s] | Cotton burns | $t_2$ [s] | Cotton burns | Classification |
|---|---|---|---|---|---|---|
| 3 | 0.80 | 0.9 | yes | 0.8 | yes | |
| 4 | 0.80 | 0.7 | yes | 1.4 | yes | |
| 5 | 0.80 | 0.8 | yes | 0.7 | no | |

Burning pieces of the samples drip down.

TABLE 4

Mixture B consisting of 90% by weight of PA 6 and 10% by weight of melamine cyanurate-glass powder-Flammhemmer (flame retardant)-Masterbatch

| Rod No. | Thickness [mm] | $t_1$ [s] | Cotton burns | $t_2$ [s] | Cotton burns | Classification |
|---|---|---|---|---|---|---|
| 1 | 0.80 | 0.8 | no | 0.8 | no | 94 V-0 |
| 2 | 0.80 | 0.5 | no | 0.8 | no | |
| 3 | 0.80 | 0.6 | no | 1.4 | no | |
| 4 | 0.80 | 0.8 | no | 0.5 | no | |
| 5 | 0.80 | 0.6 | no | 0.3 | no | |

Burning pieces of the samples drip down.

TABLE 5

Mixture C consisting of 80% by weight of PA 6 and 20% by weight of melamine cyanurate-glass powder-Flammhemmer (flame retardant)-Masterbatch

| Rod No. | Thickness [mm] | $t_1$ [s] | Cotton burns | $t_2$ [s] | Cotton burns | Classification |
|---|---|---|---|---|---|---|
| 1 | 0.80 | 0.9 | no | 0.4 | no | 94 V-0 |
| 2 | 0.80 | 1.3 | no | 1.4 | no | |
| 3 | 0.80 | 0.6 | no | 0.5 | no | |
| 4 | 0.80 | 1.4 | no | 0.8 | no | |
| 5 | 0.80 | 0.4 | no | 0.6 | no | |

Burning pieces of the samples drip down.

The invention claimed is:

1. A flame protection agent for thermoplastic molding material, the flame protection agent comprising:
   a component of 30 to 70% by weight of amorphous, porous borosilicate glass particles made of foam glass with an average particle size of 1 to 100 μm, the amorphous, porous borosilicate glass particles having the characteristics of having been produced in a high-temperature extruder and subsequently milled and classified; and
   a component of 30 to 70% by weight of melamine cyanurate, said melamine cyanurate optionally also being in the form of equimolar quantities of melamine and cyanuric acid or isocyanuric acid; and
   wherein a sum of said components totals 100% by weight.

2. The flame protection agent according to claim 1, consisting of said amorphous, porous borosilicate glass particles and said melamine cyanurate.

3. The flame protection agent according to claim 1, wherein said amorphous, porous glass particles made of borosilicate glass have the following composition:
   55.0 to 60.0% by weight of $SiO_2$;
   9.5 to 13.5% by weight of $Na_2O$;
   1.0 to 4.0% by weight of $K_2O$; 1.0 to 5.0% by weight of CaO;
   0 to 2.0% by weight of MgO;
   3.0 to 6.0% by weight of BaO: 3.0 to 5.0% by weight of ZnO;
   8.0 to 11.0% by weight of $B_2O_3$; and
   4.0 to 7.0% by weight of $Al_2O_3$.

4. The flame protection agent according to claim 1, wherein the average particle size of said amorphous, porous borosilicate glass particles lies between 2 and 6 μm.

5. A flame-retarded thermoplastic molding material, comprising:
   10 to 95% by weight of a thermoplastic polymer or a mixture of a plurality of thermoplastic polymers;
   5 to 60% by weight of the flame protection agent according to claim 1; and
   0 to 70% by weight of additives, where a sum of the components totals up to 100% by weight.

6. The thermoplastic molding material according to claim 5, wherein said additives are selected from the group consisting of fillers, reinforcing agents, additives or other processing aids.

7. The thermoplastic molding material according to claim 5, wherein said additives are selected from the group consisting of feldspar, glimmer, talc, quartz, silicate, amorphous silica, magnesium carbonate, barium sulphate, carbon fibers, aramid fibers, potassium-titanium fibers, natural fibers, glass fibers, glass beads, glass mesh, glass mats, kaolin, titanium dioxide, and wollastonite.

8. The thermoplastic molding material according to claim 7, wherein said glass fibers are selected from the group consisting of short fibers, long fibers and endless fibers.

9. The thermoplastic molding material according to claim 7, wherein said additives are surface treated fillers and reinforcing agents.

10. The thermoplastic molding material according to claim 5, wherein said additives are selected from the group consisting of plasticisers, nucleation agents, demolding and lubricating agents, flow agents and processing aids, antioxidants, heat and light stabilizers, coloring agents, pigments and other flame protection agents.

11. The thermoplastic molding material according to claim 5, configured for preparation of molds, fibers, films, and molds to be produced therefrom.

12. A masterbatch composition, comprising:
   the flame protection agent according to claim 11 consisting of 30 to 70% by weight of melamine cyanurate and 30 to 70% by weight of porous, amorphous borosilicate glass particles;
   10 to 50% by weight of a thermoplastic molding material; and
   0 to 50% by weight of additives.

13. The masterbatch composition according to claim 12, which further comprises rubber-elastic polymerisates.

* * * * *